United States Patent Office 2,973,244
Patented Feb. 28, 1961

2,973,244

PROCESS OF SINTERING ALUMINUM CONTAINING MINERALS

Gerald M. Spence, Laramie, Wyo., assignor to Monolith Portland Midwest Company, Los Angeles, Calif., a corporation of Nevada No Drawing. Filed Oct. 7, 1957, Ser. No. 688,404

8 Claims. (Cl. 23—52)

This invention relates to a new and improved process for sintering alumina containing minerals, and relates to the product which is produced by this process.

It is common knowledge that an extremely high proportion of the earth's surface consists of various materials which contain alumina in a chemically combined form. Deposits of clay, feldspars or mixtures thereof such as anorthosite and other similar minerals containing alumina and silica in combination are widely located, and are frequently very pure. Because of this a great many inventors and corporations have devoted considerable in the way of time and money to develop various processes for recovering the alumina values from such raw materials. To a large extent practically all the processes which have been the subject of study in this field have involved the sintering of these raw materials with various compounds which are adapted to place the alumina values in the raw material used in soluble form, and which are adapted to place other materials initially chemically combined with the alumina in the raw material in an insoluble form.

Thus, for example, one of the principal types of processes for recovering the alumina values from minerals, such as clay, feldspar and anorthosite and the like, which has been the subject of a great deal of study, is the so-called lime-soda sinter type of process. In the lime-soda sinter process raw materials of the type indicated are mixed together with soda, usually in the form of sodium carbonate, and lime or limestone. The resultant mixture is then heated so as to create sodium aluminate and dicalcium siilcate. From the product or a sinter resulting from this heating or sintering the sodium aluminate produced is recovered by leaching, either with water or with a dilute alkaline solution in this type of process.

In theory many of these prior lime-soda processes appear to be perfectly acceptable. However, there is a great deal of difference between theory and practice. Any sintering process for use in recovering the alumina values in raw materials, such as clay, feldspar or the like, must inherently use a rotary kiln. This is because a rotary kiln is perhaps the only type of equipment which has been developed which is suitable for continuously treating large quantities of materials at elevated temperatures at reasonable costs.

In carrying out lime-soda sinter processes with alumina containing materials in rotary kilns a number of problems have been encountered which have effectively limited the use of these lime-soda sinter prior processes on a commercial scale. One of the major problems in operating a rotary kiln in a lime-soda sinter process is the problem of ring formation. It has been determined that rings form in a rotary kiln as various chemical reactions take place. Formation of such rings would not appear to be serious to one who is unfamiliar with the kiln operation. However, such ring formation is important because the formation of a ring within a rotary kiln effectively precludes the continuous, uniform operation of the rotary kiln by precluding the uniform, consistent flow of material through such a kiln, as well as effecting heat distribution.

One of the basic limitations of the lime-soda sinter process is the fact that the product produced in a rotary kiln by sintering must be of uniform characteristics. The nature of this product in effect controls the entire remainder of the process for recovering the alumina values from alumina containing minerals. If the sinter produced is flash burned, as for example when the sinter is heated within a rotary kiln too rapidly or at too high a temperature by virtue of ring formation, this sinter is hard to grind. In addition, it cannot be satisfactorily leached, presumably because the desired chemical reaction has not taken place. If, on the other hand, the sinter obtained from a rotary kiln in a lime-soda sinter type process is underburned, or is not subjected to proper heat treatment, this sinter is extremely friable, that is, it comes apart easily, and becomes very fine on grinding. Also, difficulties are encountered when efforts are made to leach the alumina values from underburned sinter. In underburned sinter the alumina values normally have not been placed in a form in which they can be recovered in a commercially significant proportion by leaching. It can be stated that underburned sinter can be produced as a result of material travelling too rapidly through certain areas or zones of a rotary kiln as a result of ring formation and subsequent breakdown. It is to be understood, however, that both flash burned and underburned sinter can result from other than ring formation in a rotary kiln.

In order to attempt to make so-called lime-soda sinter processes of a commercial stature a number of modified rotary kiln structures have been developed. Further various details with respect to process conditions, proportions of materials, etc., have been modified in order to attempt to develop commercial lime-soda sinter processes. In general, it may be stated that these prior efforts have been unsuccessful, although certain of these efforts have definitely gone past the experimental stage.

A basic object of the present invention is to provide a new and improved process for sintering alumina-containing minerals. More specifically, it is an object of this invention to provide a process which overcomes many of the inherent disadvantages and limitations of prior art procedures as briefly indicated in the preceding discussion. This process of the present invention is based upon a more complete understanding of the chemistry involved in sintering alumina and silica containing compositions with both lime and soda, and is designed specifically for rotary kiln operation, although, of course, it may be carried out on a batch-wise basis using other types of equipment.

Another object of the present invention is to provide a new and improved sintered product containing soluble alumina values and insoluble dicalcium silicate. This product is distinguished from any prior products of a similar nature by virtue of its consistent, uniform character, its ability to be ground without the production of a large proportion of undesired fine particles and its ability to be leached in subsequent operations without gelatination and its being of such a character as to facilitate a high recovery of alumina.

Because of the nature of this invention, it is not considered necessary to set forth in this description a further long list of various objects and advantages of it. Those skilled in the art to which this invention pertains will be able to recognize various other objects and advantages of the invention from a detailed consideration of this specification, including the appended claims.

As an aid to understanding the invention, it may be stated in essentially summary form that it involves a process of s'ntering compositions containing combined alumina and silica with both lime and soda in proportions which will hereinafter be specified. During this complete process substantially all the alumina present is converted to soluble sodium aluminate and substantially all of the silica is converted to insoluble dicalcium silicate. During the process of the present invention, careful temperature control is exercised as various chemical reactions transpire, and as a result, intermediate sodium-aluminum silicates are formed, and during such formation, the process is carried out at such a rate, and under such temperature conditions that a gummy or sticky type of mixture is not obtained. In addition, in the process of the present invention, heat treatment is provided which serves to create a final sinter from these intermediate silicates, this sinter being capable of being readily leached and ground without difficulty. From the above discussion of the process, it is seen that the product or sinter obtained by this process may be distinguished from prior processes by the fact that this product is comparatively simple to grind, and is capable of being efficiently and easily leached.

In order to understand the process of the invention, it is necessary to first specify the nature of various raw materials which may be treated by a lime-soda sinter procedure as herein indicated. These raw materials all contain alumina and silica in chemical combination. In addition, these materials may contain various other oxides, such as, for example, an alkali oxide, an alkaline earth oxide, iron oxide, and the like, and these impurities may be chemically combined with the principal oxides alumina and silica. Minerals of the type used with the process of this invention may contain soda as an alkali oxide in combination with alumina and silica. Also, they may contain in chemical combination such alkaline earth oxides as calcium oxide or magnesium oxide. Examples of suitable raw materials are, feldspars or mixtures thereof such as anorthosite and various types of common clays. Chemically similar residues resulting from the treatment of bauxite or other sources can also be employed as raw materials with the process of this invention since they are essentially the equivalents of these minerals.

In carrying out the process, first the raw materials are obtained and ground as finely as possible. Preferably such grinding is carried out in the presence of soda, normally in the form of sodium carbonate, and lime or limestone so as to obtain an intimate mixture of all the reactants used in sintering. Obviously the equivalent potassimum compounds may be substituted for the sodium compounds indicated. Conveniently such grinding may be carried out using conventional wet-grinding equipment, such as, for example, ball mills or the like in the presence of recirculated process solution which may contain minor quantities of sodium aluminate, sodium carbonate or other compounds. Best results have been achieved when the grinding is carried so that at least 90% of the particles obtained as a result of the grinding pass a 200 mesh screen, inasmuch as such a finely ground mixture provides a large surface area for reactions to take place. Also, it has been determined that the presence of coarse particles during sintering tends to accelerate the formation of rings in a rotary kiln.

The proportions of the reactants used in the present invention are important. It has been found that the raw materials used may be proportioned in such a manner that from 0.9 to 1.1 mols of alkali oxide or oxides are used per mol of $Al_2O_3$. It has been found also that the alkaline earth oxide used may be proportioned with respect to the amount of silica in the ratio of from 1.9 to 2.1 mols of alkaline earth oxide or oxides per mol of $SiO_2$. Those skilled in the art to which this invention pertains will recognize that these proportions are substantially those required to form a sodium aluminate having the formula $NaAlO_2$ and dicalcium silicate.

Dicalcium silicate, or the equivalent compounds, such as magnesium oxide or barium oxide is formed in order to provide a product which contains silica in an insoluble form, so that the alumina may be separated from it during subsequent operations. The proportions of soda and/or potassium oxide to alumina present in the raw material mixture, are considered to be important in forming a highly soluble type of sodium aluminate. It is believed, on the basis of experimental work and on the basis of a number of literature articles that a large number of different compounds of sodium and alumina can be formed depending upon the proportions of the reactants containing soda and alumina employed and various process conditions. It has been discovered that if the reaction mixture employed contains too much soda with respect to the alumina present that difficulties will be encountered during sintering and subsequent treatment of the sinter produced. If a rotary kiln is employed, the tendency to form rings is greatly increased if an excess of soda is present. It has similarly been determined that if too large a proportion of alumina is used with respect to the amount of soda present, that various soda-alumina compounds of unknown composition will be formed which are not as soluble as the desired compound expressed as $Na_2O.Al_2O_3$, or $NaAlO_2$.

After a reaction mixture has been formed as indicated in the preceding discussion, it is considered necessary to remove the water from this reaction mixture prior to any sintering since both the drying and sintering operations are of a precise character and preferably are not carried out in a single rotary kiln or equivalent because of the fact that each operation has its own specific mechanical and temperature requirements which are not best met in a single piece of equipment of a presently known type. Any conventional type of drying equipment operating at a comparatively low temperature in the neighborhood of from 100° C. to 800° C. may be conveniently employed. Care must be taken in drying, however, that the product does not cool or drop in temperature in the drying apparatus employed until the moisture content has been reduced to approximately 10%. In case of such premature cooling there is apt to be difficulty because of hydrated crystals forming of the sodium carbonate which may be present. Some soda may be present as the hydroxide. These crystals will melt in their own liquid, and if they form within a dryer will cause the entire mass within this dryer to become solid. Such crystal formation will tend to segregate the reaction mixture so as to cause it to lose its homogeneous character. The homogeneous character is desired in order to facilitate subsequent reactions.

It is not considered necessary that all of the water be removed from the "raw mixture." Preferably a sufficient amount of moisture, at least 5%, remains in this mixture so as to aid in forming nodules of material which can be easily handled and processed. It is considered necessary, however, to have it sufficiently dry so that less than 10% free moisture remains in the so-called "dry" product. If any greater amount of water than this is present within this product, the product tends to "sweat" during storage, causing lumps to form which hamper material handling prior to sintering. It is considered substantially immaterial if various minor chemical reactions take place during the drying operation itself. Any effort to dry the raw material mixture employed in the process of this invention in the same rotary kiln used to cause sintering is considered to be extremely disadvantageous and impractical because of difficulties in controlling the process conditions involved. The use of temperatures in excess of 1500° F. during drying will tend to cause reactions which, in accordance with the teachings of this invention, should be carried out during sintering.

As will be realized from a consideration of the remainder of this description, control is one of the principal features in the process of the present invention, and careful control is necessary in order to cause the desired chemical reactions at the desired time, and is necessary in order to prevent ring formation when a rotary kiln is used in sintering. After a properly dried raw mixture has been created, this mixture may be directly sintered. Preferably, in accordance with this invention, this sintering is carried out in stages in such a manner that the temperatures to which the raw material mixture is subjected during each of these stages during sintering are very carefully controlled.

When limestone (calcium carbonate) has been added to such a raw material mixture in order to provide an alkaline earth oxide, calcination normally takes place at about 1517° F. Almost simultaneously during heating of the raw material mixture at a temperature of about 1564° F., sodium carbonate tends to fuse or become semi-liquid and tends to act as a flux. This sodium carbonate is to a large extent considered to be responsible for certain types of ring formation in prior sintering processes using rotary kilns. As the sodium carbonate fuses during sintering it tends to attack the raw material containing alumina so as to form various sodium-aluminum silicates of an unknown composition.

An important feature of the present invention is to carry out the initial sintering or sintering stage or step with the raw material mixture at a sufficiently low temperature and sufficiently slowly so that these sodium aluminum silicates of an unknown composition are gradually formed as the sodium carbonate tends to fuse under conditions so that the sodium carbonate is reacted substantially at the same rate at which it is fused. Preferably the reaction mixture is agitated during this initial sintering stage so as to faciliate the formation of these sodium-aluminum silicates of unknown composition by distributing the sodium carbonate as it tends to change from its initial state and so as to facilitate heat transfer.

Such agitation may be carried out using various types of stirring apparatus in conventional heating equipment, or may be conveniently carried out through the operation of a rotary kiln when this sintering stage or step is performed in such a rotary kiln. Preferably the mixture during this initial sintering step is heated from the temperature at which sodium carbonate tends to fuse, 1564° F., to not to exceed 1900° F. for a period which will depend upon the quantities of material present and the degree of agitation utilized at a sufficiently slow rate so that rings or related balls or lumps of greater than about ½ inch diameter do not form in a rotary kiln or other apparatus employed. Such balls or lumps if larger than ½ inch diameter will normally not react completely in the subsequent sintering step. Those skilled in the art to which this invention pertains will be able to determine the precise rates of heating and the times required with a minimum of experimentation; obviously these times and rates will depend upon the equipment used and the quantities of material being treated as well as other factors such as for example, the quantity of alkali metal oxide present within the initial raw material which is chemically combined with alumina.

This initial sintering step when performed in a rotary kiln may be advantageously carried out in a separate kiln from the equipment employed in the subsequent sintering step in order to provide the degree of control necessary for the entire process. When separate rotary kilns are employed for each of the sintering steps involved in the process of this invention kiln structures such as are shown in the co-pending Schoonover application, Serial No. 650,643, may be advantageously used since means are provided in such structures for controlling each of the kiln sections employed independently of one another and for transferring partially reacted material between the kiln sections without cooling this material to any great extent. However, it is noted that the material after the initial sintering step of the present invention may be cooled prior to the final sintering of this material, and that this final sintering may be carried out using batch types of equipment instead of rotary kilns.

The final sintering employed with the present invention preferably is carried out at a temperature of from about 2200° F. to 2500° F. for a period sufficient to break down the various sodium-aluminum silicates formed as intermediate compounds as indicated above and for a sufficient period to cause a reaction between the calcium oxide present and the silica present resulting in the formation of di-calcium silicate. This reaction is preferably carefully controlled by gradually bringing the temperature of the reaction mixture during the final sintering within the temperature range indicated and maintaining such temperature so as to avoid a great amount of heat which will cause the entire reaction mixture to form what can be termed "flash burned" sinter. Such a "flash burned" sinter is a fused, glassy material which is difficult to grind and to leach. The formation of such a "flash burned" sinter is normally detrimental to the equipment employed during this sintering step.

By slowly heating or "soaking" the reaction mixture during this final sintering within the temperature range indicated for a period of from about 20–60 minutes, a "dead burned" or correctly burned sinter is formed which is capable of being ground without extremely fine particles resulting. The time required for this "soaking" period will, of course, depend upon the nature of the reacted material, and can be readily determined with a minimum of experimentation. A "dead burned" sinter is desired with this invention because of the fact that a higher percentage of alumina can be extracted from this material than can be extracted from a "flash burned" or "fat burned" sinter.

A "fat burned" or under burned sinter is an "unshrunken" porous, sinter resulting from the application of insufficient heat; when such a sinter is ground extreme quantities of fines are produced. When such "fat burned" sinter is ground and leached, difficulties tend to be encountered because of gel phenomena, and a comparatively low recovery of alumina or sodium aluminate tends to result. A "dead burned" sinter as desired with the present invention is normally of a bright apple green color when anorthosite is used as a starting material, is brittle in nature, shows evidence of incipient fusion by the presence of gas holes within the particles of the sinter, and has a slightly glassy surface appearance. In addition the desired "dead burned" sinter tends to contain "plates" or layers of sodium aluminate between layers of dicalcium silicate. As opposed to this a "fat burned" sinter is of a light apple green color when anorthosite is used as a starting material, is somewhat friable, shows little evidence of fusion, and is somewhat porous. Particles of "dead burned" sinter tend to be much smaller in size than particles of "fat burned" sinter of the same weight.

If desired, a "flash burned" sinter as referred to above can be differentiated from an "over burned" sinter since it results from the application of too much heat initially. An "over burned" sinter results from the application of too high a temperature for a prolonged period. Such an "over burned" sinter is usually of a dark blue or black color when anorthosite is employed as a starting material and is brittle and glassy. Both a "dead burned" sinter as desired with this invention and an "over burned" sinter have approximately the same specific gravity when powdered so as to pass a 200 mesh screen; under the same conditions the specific gravity of "fat burned" sinter will be less. The specific gravity of any sinter will, of course, vary depending upon the composition of this sinter.

In the final sintering step employed with this invention, it is possible to tell if the sintering is being carried on properly in a rotary kiln by the action of the material within the hottest region of a kiln. "Under burned" sinter within this region of a kiln will appear as loosely rolling material whereas a "dead burned" sinter within this region of the kiln will have a tendency to crawl upon the sides of the kiln and cascade. "Over burned" sinter will behave in the hot zone or region of a kiln similarly to "dead burned" sinter, but will be sufficiently sticky so as to gradually agglomerate into balls or the like of various sizes greater than ½ inch in diameter.

The reactions which take place during this final sintering step with this invention are time-temperature reactions. A period of about 60 minutes is normally required at a temperature of 2200° F.; whereas a period of about 20 minutes is required if a temperature of about 2500° F. is employed. In general, the lower the silica and the higher the soda content of the material in this final sintering step the shorter the period required. If temperatures and times greater than indicated are employed, or if an "over burned" sinter is produced some alkali metal oxide normally will be placed in an insoluble form. It is noted, however, that "soaking" at an elevated temperature as specified of "flash burned" sinter during this final sintering step will tend to convert this undesired sinter to the desired "dead burned" sinter structure. Such conversion or reconversion apparently is the result of heat and time causing a molecular rearrangement within the sintered particles. If alkali metal oxides has been lost due to volatilization a complete change of "dead burned" sinter to "hard burned" sinter obviously cannot take place. This conversion or reconversion during the final sintering is advantageous in producing a uniform "dead burned" product from which the alumina values may be recovered.

As an aid to understanding this invention the following is given as a specific example of it. In carrying out the process herein described a mixture of anorthosite, lime (or limestone) and sodium carbonate, this mixture having a dry analysis (by weight) as follows: 19.05% $SiO_2$; 0.93% $Fe_2O_3$; 9.57% $Al_2O_3$; 35.0% CaO; 5.98% $Na_2O$; and 28.48% loss ($CO_2$) was ground in the presence of water to produce a slurry passing a 200 mesh screen having a pulp density of 1.620 grams per liter and a moisture content of 38%. Next the slurry formed as above was dried at 500° F. in a rotary drying kiln to a 5% water content. The dried product was initially sintered while being agitated in a rotary kiln at 1700° F. for a period of about 30 minutes. The product of this initial sintering step was then sintered at a temperature of about 2450° F. for a period of 30 minutes. As a result of this final sintering a "dead burned" sinter was formed which contained (by weight) 26.78% $SiO_2$, 1.42% $Fe_2O_3$, 13.67% $Al_2O_3$, 48.72% CaO, and 8.77% $Na_2O$. This sinter was of a bright apple green color, and contained plates or layers of sodium aluminate dispersed in a dicalcium silicate matrix which were visible when examined with a microscope.

Those skilled in the art to which this invention pertains will realize that the process herein described differs from a number of prior procedures in that very carefull control is used in order to create a sinter of a uniform character, which sinter may be readily ground and leached without the production of undue fines and without gelatin difficulties. While the individual steps in the process of this invention are, in general, separate from one another, those skilled in the art will realize that nevertheless some reactions desired in the final sintering step may take place in the initial sintering step. Similarly, some reactions desired in other steps may also take place during drying due to various localized heating effects or the like. Such unwanted reactions during the individual steps of the present invention are of a minor category and may be neglected as far as the entire process is concerned.

An important advantage of the process of this invention is the fact that due to the steps employed in this process and the control involved in these steps that comparatively little alkali metal oxide, or $Na_2O$ is lost due to volatilization, such as may be caused by overheating in the normal circumstances.

Because of the nature of this invention, it is to be considered as being limited only by the appended claims forming a part of this specification, and these claims are to be interpreted in the light of this specification and the patent doctrine of equivalents.

I claim:

1. A "dead burned" sinter containing soluble sodium aluminate and insoluble dicalcium silicate, said sinter being composed of particles, each of said particles having plates of sodium aluminate located therein, said plates being located in a matrix of dicalcium silicate, each of said particles showing evidence of incipient fusion by having a slightly glossy surface appearance, each of said particles having gas holes formed therein.

2. A "dead burned" sinter containing soluble sodium aluminate and insoluble dicalcium silicate, said sinter being composed of particles, each of said particles being of a bright apple green color and having plates of sodium aluminate located therein, said plates being located in a matrix of dicalcium silicate, each of said particles showing evidence of incipient fusion by having a slightly glossy surface appearance, each of said particles having gas holes formed therein, each of said particles being brittle.

3. A process for producing a sinter containing soluble sodium aluminate and insoluble dicalcium silicate from a material in which alumina is chemically combined with silica, which process comprises: forming a finely ground mixture of an alkaline earth oxide, and alkali metal oxide, and a material in which alumina is chemically combined with silica; simultaneously heating said mixture at a temperature above the fusing point of said alkali metal oxide while agitating said mixture so as to react said alkali metal oxide within said mixture with said material at substantially the same rate at which said alkali metal oxide fuses in order to form lumps of intermediate alkali metal aluminum silicates as said alkali metal oxide fuses, said lumps being not greater than about one-half inch in diameter; and further heating said mixture at a temperature greater than the temperature of said initial heating so as to break down said intermediate silicates and form a sinter containing an alkali metal aluminate and an alkaline earth silicate.

4. A process for producing a sinter containing soluble sodium aluminate and insoluble dicalcium silicate from a material in which alumina is chemically combined with silica, which process comprises: forming a mixture of CaO, $Na_2O$ and a material in which alumina is chemically combined with silica, said mixture being ground so as to pass a 200 mesh screen; heating said mixture at a temperature of from 1564° F. to 1900° F. while continuously agitating said mixture, said heating being carried on for a sufficient period and at a rate sufficient to react substantially all of said $Na_2O$ with said material at substantially the rate said $Na_2O$ fuses so as to form lumps of intermediate sodium aluminum silicate reaction products, said heating and said agitation being carried out so that lumps of said reaction products greater than about one-half inch in diameter do not form; and further heating said mixture at a temperature of from 2200° F. to 2500° F. for a sufficient period to break down said intermediate reaction products and to form insoluble dicalcium silicate and soluble sodium aluminate.

5. A process for producing a sinter containing a soluble alkali metal aluminate and insoluble alkaline earth silicate from a material in which alumina is chemically combined with silica, which process includes: forming an aqueous slurry containing an alkaline earth oxide, and alkali metal oxide and a material in which alumina is chemically combined with silica, the particles within said slurry being sufficiently fine so as to pass a 200 mesh screen; drying said slurry at a temperature of from 212° F. to 1900° F. while continuously agitating said dried slurry for a sufficient period to react substantially all of said alkali metal oxide with said material as said alkali metal oxide fuses in order to form intermediate alkali metal aluminum silicate reaction products as said alkali metal oxide fuses; and further heating the mixture resulting from said heating at a temperature of from 2200° F. to 2500° F. for a sufficient period to break down said intermediate rection products and form an insoluble alkaline earth silicate and a soluble alkali metal aluminate, said further heating serving to create a sinter of a "dead burned" category.

6. A process for producing a "dead burned" sinter containing a soluble alkali metal aluminate and an insoluble alkaline earth silicate from a material in which alumina is chemically combined with silica, which process includes: forming an aqueous slurry containing alkaline earth oxide, an alkali metal oxide and a material in which alumina is chemically combined with silica, the particles within said slurry being sufficiently fine so as to pass 200 mesh screen, said slurry containing from about 1.9 to about 2.1 mols of alkaline earth oxide per mol of silica and from about 0.9 to about 1.1 mols of alkali metal oxide per mol of alumina; drying said slurry at a temperature of from about 212° F. to about 1500° F. to a moisture content of less than 10%; heating said dried slurry at a temperature of from about 1564° F. to about 1900° F. while continuously agitating said dried slurry so as to cause substantially all of said alkali metal oxide to react with said material to form intermediate reaction products of a "non-sticky" character as said alkali metal is fused; and further heating said dried slurry at a temperature of from about 2200° F. to about 2500° F. for a period of from about 20 to about 60 minutes in order to break down said intermediate reaction products and form a "dead burned" sinter containing an insoluble alkaline earth silicate and a soluble alkali metal aluminate.

7. A process as defined in claim 4 wherein said $Na_2O$ is in the form of sodium carbonate.

8. A process as defined in claim 4 wherein said CaO is in the form of calcium carbonate.

References Cited in the file of this patent

UNITED STATES PATENTS

| | | |
|---|---|---|
| 708,561 | Kayser | Sept. 9, 1902 |
| 1,591,365 | Cowles | July 6, 1926 |
| 1,891,608 | Scheidt | Dec. 20, 1932 |
| 1,926,744 | James | Sept. 12, 1933 |
| 2,347,736 | Fisher | May 2, 1944 |

OTHER REFERENCES

Dana: "A Textbook of Mineralogy," 4th ed., pp. 615–617, John Wiley and Sons, Inc., 1932.